Figure 1:
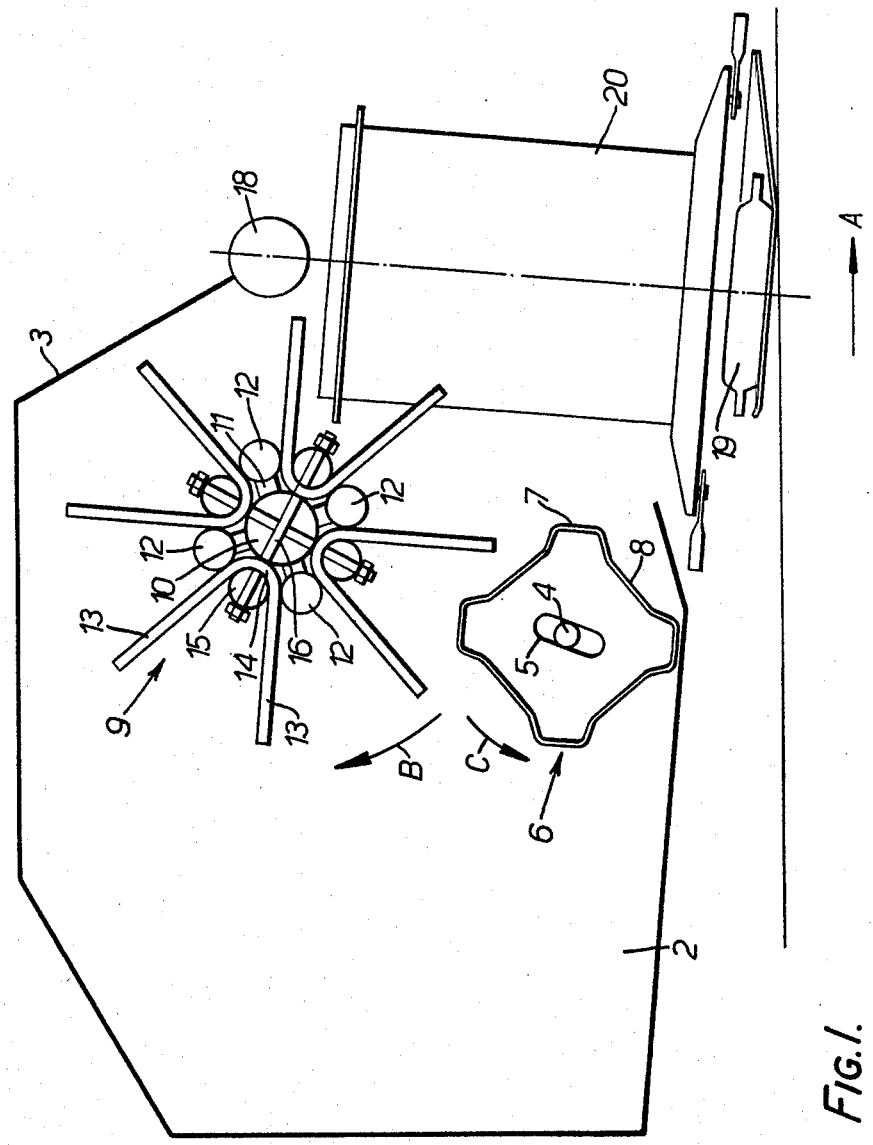

United States Patent [19]
Zweegers

[11] 4,321,782
[45] Mar. 30, 1982

[54] DROP CRUSHING DEVICE

[76] Inventor: Petrus W. Zweegers, Nieuwendijk 46, Geldrop, Netherlands

[21] Appl. No.: 172,549

[22] Filed: Jul. 28, 1980

[30] Foreign Application Priority Data

Aug. 30, 1979 [NL] Netherlands ......................... 7906505

[51] Int. Cl.³ ............................................ A01D 49/00
[52] U.S. Cl. ..................................... 56/1; 56/DIG. 1
[58] Field of Search .................. 56/DIG. 1, 192, 14.4, 56/364, 400

[56] References Cited
U.S. PATENT DOCUMENTS 2,711,622  6/1955  Cunningham ................. 56/DIG. 1
2,922,522  7/1961  Cunningham ................. 56/DIG. 1
3,412,446  11/1968  Wood ............................ 56/DIG. 1

Primary Examiner—Jay N. Eskovitz
Attorney, Agent, or Firm—Edmund M. Jaskiewicz

[57] ABSTRACT

A crop crushing device has two crushing members rotating about substantially parallel rotary axes. One crushing member has a plurality of fillets extending substantially in the direction of the length of the crushing member and arranged at equal intervals around the circumference of this crushing member. The other crushing member is provided with flexible wings extending outwardly away from the rotary axis.

10 Claims, 2 Drawing Figures

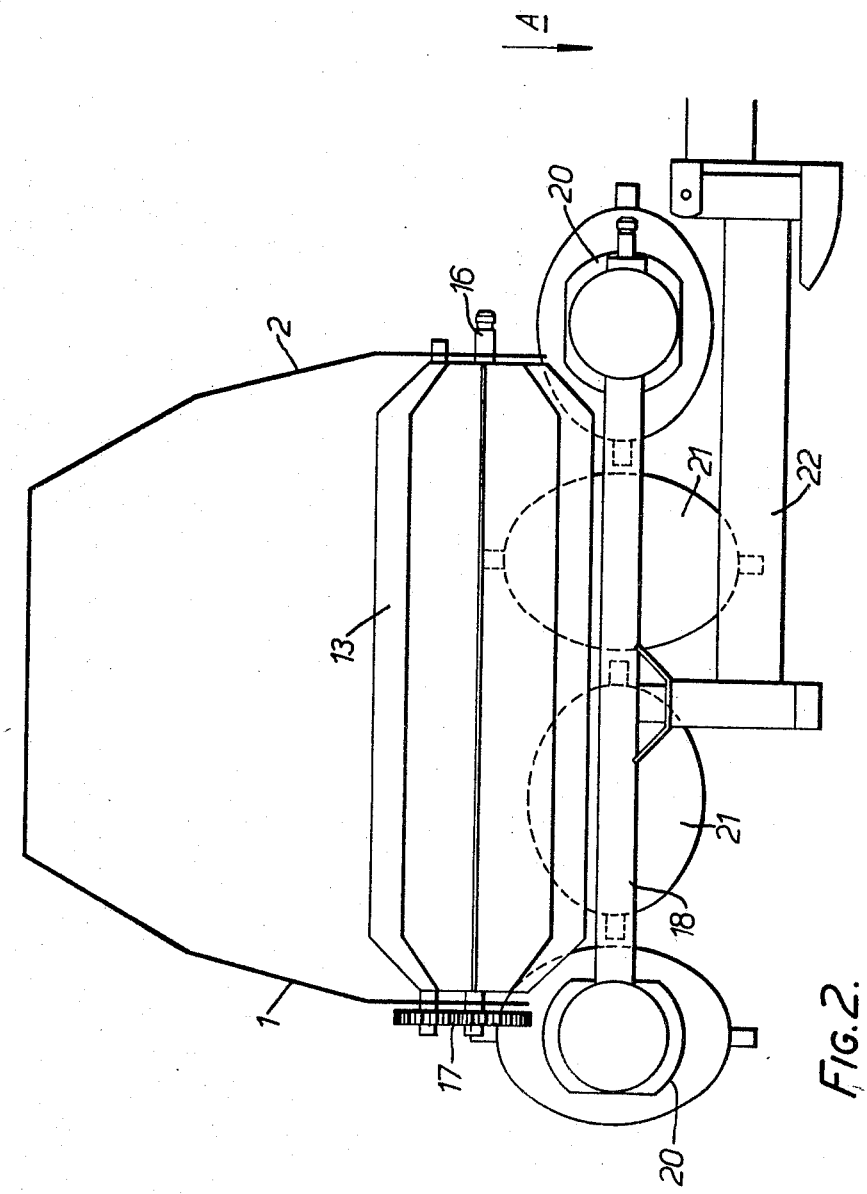

DROP CRUSHING DEVICE

The invention relates to a crop crushing device comprising two crushing members adapted to rotate about substantially parallel rotary axes.

Known devices for crushing crops are commonly provided with two relatively co-operating rollers having grooves on their surfaces extending in the direction of length of the rollers. One of the rollers, usually an upper roller, is arranged in the frame of the device so as to be movable in a vertical direction in order to match the thickness of layers of crops passed between the rollers. An important disadvantage of these known devices is that, when a comparatively thick plug of crops is moving between the rollers, parts of the rollers at other locations may be spaced apart by such a large distance that at these locations the crops moving between the rollers is not effectively crushed. Apart from this, the provision of a roller movable in a vertical direction in the frame of the device brings about a complicated structure with regard to guiding and driving such a roller.

The invention has for its object to provide a device in which the disadvantages inherent in the known devices can be avoided.

Accordingly the present invention provides a device for crushing crops comprising two crushing members arranged to rotate about substantially parallel rotary axes in which one crushing member is provided with a plurality of fillets extending substantially in the direction of the length of the crushing member and arranged at equal intervals around the circumference of the crushing member, and other crushing member is provided with flexible wings extending outwardly away from the rotary axis.

By using the arrangement of the invention a flexible wing can match the thickness of a layer of crop passed at a given point between the crushing members so that at any point in the direction of length the two crushing members continue effectively co-operating with one another so that throughout the working width of the device the crop will be effectively crushed. It is then not necessary to arrange one of the crushing members in the frame so as to be movable in a vertical direction of height to accommodate various thicknesses of crop so that in addition a simple construction and drive to the crushing members can be realised.

The invention will be described more fully hereinafter with reference to the accompanying Figures schematically showing an embodiment of a construction in accordance with the invention.

FIG. 1 is a schematic sectional view of a crushing device embodying the invention combined with a mower arranged to move over the ground, FIG. 2 is a schematic plan view of the combination of FIG. 1, the upper wall of the protective hood of the crushing device being omitted to expose parts located beneath.

The frame of the crushing device comprises a protective hood including two upwardly directed sidewalls 1 and 2, the two foremost portions of which viewed in the intended direction of movement or in the ground, in operation, indicated by the arrow A extend substantially parallel to one another, whereas further to the rear the distance between the sidewalls 1 and 2 gradually decreases.

At the top the sidewalls 1 and 2 are interconnected by a top wall 3.

Bearings (not shown) fastened to the sidewalls 1 and 2 hold a shaft 4. The ends of the shaft 4 are passed through elongated holes 5 extending upwards in the sidewalls 1 and 2 so that with respect to the sidewalls 1 and 2 the shaft 4 is displaceable in a generally vertical direction and may be fixed in a selected position.

By means of tie members (not shown) a crushing member 6 is fastened to the horizontal shaft 4. In the embodiment shown the crushing member 6 comprises four fillets 7 of more or less U-shaped cross-section, which are arranged at equal intervals around the shaft 4, whilst the ends of the limbs of the U-shaped fillet are interconnected by flat plate parts 8, which are spaced from the shaft 4 by a smaller distance than the outermost parts of the fillets 7.

For co-operation with the crushing member 6 a second crushing member 9 is arranged between the sidewalls 1 and 2 of the crushing device. The crushing member 9 comprises a central shaft 10 extending parallel to the shaft 4 and being journalled rotatably in bearings fastened to the sidewalls 1 and 2. To the shaft 10 are fastened with the aid of tie members 11 rods 12 extending parallel to the shaft 10, in this embodiment four rods, which are arranged at equal intervals around and near the shaft 10.

The shaft 10 is furthermore provided with a plurality of wings 13, in this embodiment eight wings extending outwardly from the shaft 10. The wings 13 extending over the whole length of the shaft 10 between the sidewalls 1 and 2 of the protective hood are integral in pairs in this embodiment so that every two wings are interconnected by a web 14. The wings 13 are made from flexible material, for example, canvas-reinforced rubber and secured to the shaft 10 with the aid of bars 15 parallel to the rods 12 and of bolts 16. From FIG. 1 it will be apparent that a bar 15 is in contact with the wall of the web 14 remote from the shaft 10 between the two wings 13, the bar 15 being drawn in between two neighbouring rods 12 so that the web 14 between two wings 13 is clamped in a curved state between a bar 15 and two neighbouring rods 12.

For driving the two crushing members an extension 16 of the shaft 10 protrudes from a side of the crushing device. The extension can be coupled for driving purposes with an auxiliary drive shaft or the like. On the other side of the device a chain or gear wheel transmission 17 links the shaft 10 of the crushing member 9 to the shaft 4 of the crushing member 6. In operation the two crushing members 9 and 6 are driven in a manner such that the crushing member 9 rotates in the direction of the arrow B and the crushing member 6 in the direction of the arrow C.

In the embodiment shown the crushing device described above is combined with a mowing machine of known type, the frame of which comprises an upper frame beam 18 and a lower frame beam 19. Between the ends of the frame beams 18 and 19 are arranged drum-shaped cutting members 20, and between these drum-shaped cutting members 20 dish-shaped mowing members 21 are arranged. The upper frame beam 18 is pivoted to one end of a connecting arm 22, the other end of which is pivoted to a frame portion (not shown), which can be hitched to an agricultural tractor or the like. The cutting members can be driven via a shaft 23, one end of which projects out of the frame bean 18, which shaft may be driven in operation like the shaft 16 through a transmission mechanism (not shown) from the power take-off shaft of an agricultural tractor or the like propelling the device.

In operation the crop mowed by the cutting members 29 and the mowing dishes 21 will be thrown to the rear in between the two crushing members 6 and 9, which are driven during operation. The number of revolutions of the crushing member 9 per minute amounts to half the number of revolutions per minute of the crushing member 6. The drive is synchronized so that one end of a flexible wing 13 moves in the space between two consecutive fillets 7 of the crushing member 6. By setting the pinion or chain transmission 17 intercoupling the two crushing members 6 and 9 it can be ensured that the end of a wing 13 passes between the fillets 7 in a manner such that said end co-operates with a leading fillet, a trailing fillet 7 or moves between said two fillets across the space between them. The distance between the ends of a wing 13 and the circumferential surface of the crushing member 6 may be varied by displacing the crushing member 6. This displacement of the member 6 is performed by displacing the shaft 4 in the elongated holes 5, the longitudinal axes of which coincide with the lines of connection between the centre lines of the shafts 4 and 10. Although in the embodiment shown said line of connection is at an angle differing from 90° to the horizontal, this line of connection may, as an alternative, be perpendicular so that the two crushing members are in vertical superposition.

It will be apparent that with the above-described possibilities of adjustment, the crushing device can be optimally adapted to the operational conditions and to the kind of the crop to be treated whilst nevertheless the construction of the device is particularly simple.

In this construction each flexible wing can readily match the thickness of the layer of crop locally occurring in the direction of length of the crushing members to an extent such that the outer edge of the wing 13 effectively remains in contact with the crop to be worked along at least substantially the whole length of the crushing member concerned. Though being flexible, preferably by being made from flexible material, the wings 13 must, of course, have adequate rigidity for effectively crushing the crop. The centrifugal effect contributes to the tendency of the wings 13 to maintain their position in FIG. 1, whilst counter-acting a deflection by the action of the crop.

In practice it has been found that by using the device according to the invention various kinds of crops, for example, lucerne rich in leaves and clover, as well as stem crop such as grass can be effectively crushed.

The crushing device is preferably coupled with the frame of the mower so as to be readily detachable so that the mower may also be used without crushing device. Furthermore, the crushing device according to the invention may, of course, be utilized in a different manner, for example, in combination with a pick-up reel with the aid of which previously cut grass can be picked up from the ground and fed to the crushing device. Within the spirit and scope of the invention other variants of the construction described are possible. Though in the embodiment shown the wings 13 have a length corresponding with the effective length of the crushing member 9, a wing 13 may, as an alternative, be assembled from a plurality of adjacent parts. Moreover, for example, the ends of the wings may be strengthened to enhance the striking force of the wings. The lower crushing member 6 may also be designed in different ways. The crushing member 6 may be formed by a round pipe having fillets at its circumference. Then these fillets need not have a U-shaped profile as those shown in this embodiment; these fillets might be formed by strips or the like extending outwardly away from the rotary axis. It is, however, preferred to ensure that at the ends of the wings 13 the circumferential speed is different to the circumferential speed of the parts 8 located between the fillets 7, by which a satisfactory crop crushing effect is obtained, whilst at the same time the possibility of deflection of the wings 13 is enhanced. Although in the embodiment described above the crushing members are in horizontal positions, a different disposition, for example, in the vertical direction is also possible.

What is claimed is:

1. A device for crushing crops comprising two crushing members arranged to rotate about substantially parallel rotary axes, one of said crushing members is provided with a plurality of fillets extending substantially in the direction of the length of the crushing member and arranged at equal intervals around the circumference of the crushing member, and the other crushing member is provided with a plurality of flexible wings extending radially outwardly from its rotary axis along the length thereof.

2. A device as claimed in claim 1 wherein the two crushing members are arranged to be driven in synchronism in a manner such that one end of a wing moves in a respective space between two consecutive fillets.

3. A device as claimed in claim 1 wherein the distance between the axes of the two crushing members is adjustable.

4. A device as claimed in claim 2 wherein the drive of the two crushing members is adjustable so that in operation the end of a wing has a predetermined lag with respect to the respective fillets moving in synchronism therewith.

5. A device as claimed in claim 1 and arranged for movement over the ground, when viewed in the direction of movement during operation said device has one crushing member above the other crushing member and the rotary axis of the upper crushing member is located in front of the rotary axis of the lower crushing member.

6. A device as claimed in claim 1 wherein the two crushing members are relatively adjustable in a plane passing through the rotary axes of the two crushing members.

7. A device as claimed in claim 1 wherein the wings are made from flexible material.

8. A device as claimed in claim 7 wherein two wings are integral with one another and a web between the two wings is clamped between three bars extending parallel to the rotary axis of the associated crushing member.

9. A device as claimed in claim 1 wherein during operation the two crushing members are driven to rotate at different speeds.

10. A device as claimed in claim 1 wherein during operation the ends of the wings of said other crushing member and the parts of said one crushing member located between the fillets have different circumferential speeds.

* * * * *